United States Patent
Moudgill et al.

(10) Patent No.: US 11,928,465 B2
(45) Date of Patent: Mar. 12, 2024

(54) DEVICE AND METHOD FOR CALCULATING ELEMENTARY FUNCTIONS USING SUCCESSIVE CUMULATIVE ROTATION CIRCUIT

(71) Applicant: Optimum Semiconductor Technologies Inc., Tarrytown, NY (US)

(72) Inventors: Mayan Moudgill, Chappagua, NY (US); Pablo Balzola, Madrid (ES); Murugappan Senthivelan, Fanwood, NJ (US); Vaidyanathan Ramdurai, Tarrytown, NY (US); Sitij Agrawal, Tarrytown, NY (US)

(*) Notice: Subject to any disclaimer, the term of this patent is extended or adjusted under 35 U.S.C. 154(b) by 116 days.

(21) Appl. No.: 17/427,843

(22) PCT Filed: Feb. 20, 2020

(86) PCT No.: PCT/US2020/018976
§ 371 (c)(1),
(2) Date: Aug. 2, 2021

(87) PCT Pub. No.: WO2020/172369
PCT Pub. Date: Aug. 27, 2020

(65) Prior Publication Data
US 2022/0129262 A1    Apr. 28, 2022

Related U.S. Application Data

(60) Provisional application No. 62/807,852, filed on Feb. 20, 2019.

(51) Int. Cl.
*G06F 9/30* (2018.01)
*G06F 7/544* (2006.01)
(Continued)

(52) U.S. Cl.
CPC .......... *G06F 9/3001* (2013.01); *G06F 7/5446* (2013.01); *G06F 7/548* (2013.01);
(Continued)

(58) Field of Classification Search
None
See application file for complete search history.

(56) References Cited

U.S. PATENT DOCUMENTS

| 4,896,287 A | 1/1990 | O'Donnell et al. |
| 5,134,578 A * | 7/1992 | Garverick .......... G05B 19/0423 708/650 |

(Continued)

FOREIGN PATENT DOCUMENTS

CA    2255223 A1    6/2000

OTHER PUBLICATIONS

International Application No. PCT/US2020/018976, International Search Report and Written Opinion dated May 7, 2021, 12 pages.
(Continued)

*Primary Examiner* — Eric Coleman
(74) *Attorney, Agent, or Firm* — Zhong Law, LLC

(57) ABSTRACT

A system and an accelerator circuit including a register file comprising instruction registers to store an instruction for evaluating an elementary function, and data registers comprising a first data register to store an input value. The accelerator circuit further includes a successive cumulative rotation circuit comprising a reconfigurable inner stage to perform a successive cumulative rotation recurrence, and a determination circuit to determine a type of the elementary function based on the instruction, and responsive to determining that the input value is a fixed-point number, configure the reconfigurable inner stage to a configuration for evaluating the type of the elementary function, wherein the successive cumulative rotation circuit is to calculate an (Continued)

evaluation of the elementary function using the reconfigurable inner stage performing the successive cumulative rotation recurrence.

18 Claims, 4 Drawing Sheets

(51) Int. Cl.
    *G06F 7/548*          (2006.01)
    *G06F 17/17*         (2006.01)
    *G06F 5/01*           (2006.01)

(52) U.S. Cl.
    CPC ............ *G06F 9/3013* (2013.01); *G06F 17/17* (2013.01); *G06F 5/01* (2013.01)

(56) References Cited

U.S. PATENT DOCUMENTS

| | | | |
|---|---|---|---|
| 6,385,632 B1* | 5/2002 | Choe | G06F 7/5446 |
| | | | 712/7 |
| 8,510,354 B1 | 8/2013 | Langhammer | |
| 8,572,150 B1* | 10/2013 | Dick | G06F 7/5446 |
| | | | 708/441 |
| 10,168,992 B1* | 1/2019 | Pillai | G06F 7/483 |
| 2006/0282489 A1* | 12/2006 | Khan | G06F 9/3879 |
| | | | 708/422 |
| 2011/0119520 A1 | 5/2011 | Khan et al. | |
| 2011/0320513 A1 | 12/2011 | Langhammer | |
| 2012/0089807 A1 | 4/2012 | Rupley | |
| 2018/0321910 A1 | 11/2018 | Langhammer et al. | |

OTHER PUBLICATIONS

Meher et al., "50 Years of CORDIC: Algorithms, Architectures, and Applications", IEEE Transactions on Circuits and Systems, vol. 56, No. 9, 2009, pp. 1893-1907.
International Application No. PCT/US2020/018975, International Search Report and Written Opinion dated Jun. 15, 2021, 15 pages.
Chinese Search Report issued in CN Application No. 202080028532.X, dated Jul. 26, 2023, 3 pages.
Chinese Search Report issued in CN Application No. 2020800287147, dated Aug. 19, 2023, 3 pages.
Pramod K. Meher, "50 Years of CORDIC: Algorithms, Architectures, and Applications," pub. date: Sep. 2009.
European Search Report issued in EU Application No. 20759868, dated Dec. 14, 2022, 9 pages.
Milos D. Ercegovac, REFEREX, Jan. 2004 (Jan. 1, 2004), XP040426237.
Alvaro Vazquez, "Implementation of the Exponential Function in a Floating-Point Unit," pub. date: Nov. 3, 2000.
U.S. Non Final Office Action issued in U.S. Appl. No. 17/427,832 dated May 2, 2023, 25 pages.
Chinese 1st Office Action issued in CN Application No. 202080028532.X dated Jul. 29, 2023.
Chinese 1st Office Action issued in CN Application No. 202080028714.7 dated Aug. 24, 2023.
European Search Report issued in EU Application No. 20760098.2, dated Oct. 18, 2022, 8 pages.

\* cited by examiner

DEVICE AND METHOD FOR CALCULATING ELEMENTARY FUNCTIONS USING SUCCESSIVE CUMULATIVE ROTATION CIRCUIT

CROSS-REFERENCE TO RELATED APPLICATIONS

This application is a national stage application of PCT/US2020/018976 filed Feb. 20, 2020, which claims priority to U.S. provisional application 62/807,852 filed Feb. 20, 2019. The contents of above-identified applications are hereby incorporated by reference in their entireties.

TECHNICAL FIELD

The present disclosure relates to circuits and methods for implementing certain elementary functions, and in particular to circuits and methods for calculating non-trigonometric elementary functions using successive cumulative rotation circuit.

BACKGROUND

An accelerator circuit such as a graphical processing unit (GPU) may include circuits configured to perform the calculations of numerical functions. The numerical functions may convert one or more input values into one or more output values according to certain mathematical relations defined by the numerical functions. Examples of the numerical functions may include elementary functions that are widely used in practical applications such as image processing and machine learning.

The types of operators used to carry out the calculations of the numerical functions determine the complexity of circuits implementing these numerical functions and the time needed to perform these calculations. It is known that the circuit implementation of a multiplication operator is much more complex compared to the circuit implementation of a shift operator or an addition operator. Thus, circuits with small footprint integrated circuits (e.g., small-footprint field-programmable gate array (FPGA) circuits) often do not support direct calculation of a multiplication operator.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
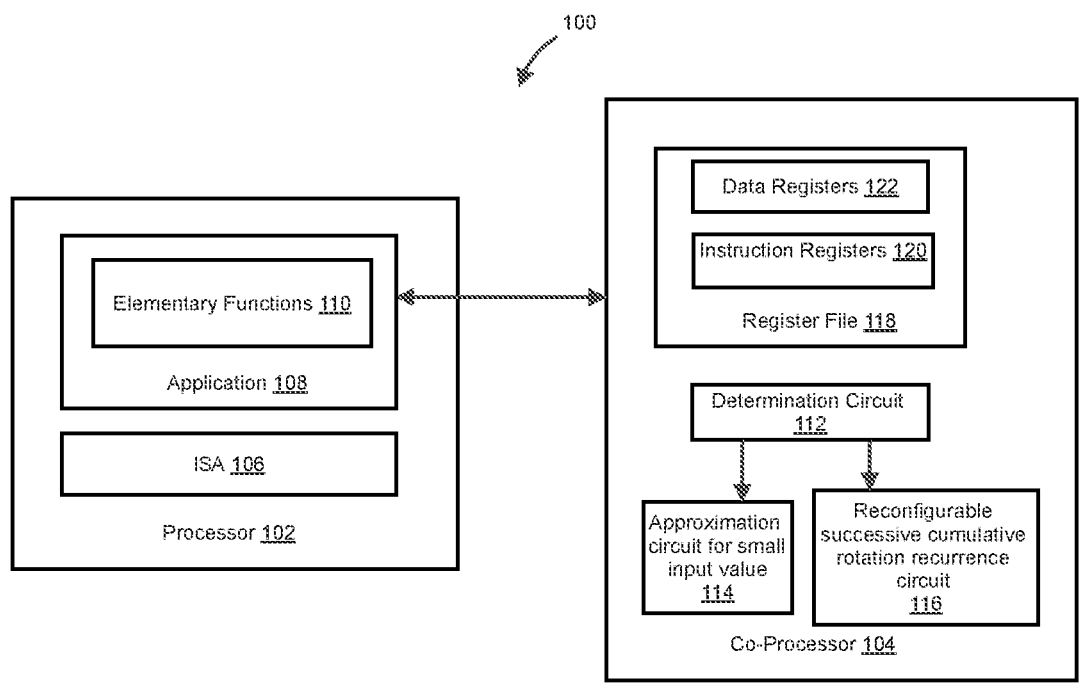
FIG. 1 illustrates a system for performing the calculation of elementary functions according to an implementation of the disclosure.

Implementations of the disclosure employ the successive cumulative rotation algorithm to perform calculations of elementary functions. The successive cumulative rotation algorithm uses cumulations and rotations rather than multiplications to perform the calculations, thus significantly reducing the complexity of the hardware circuit implementing these numerical functions. Further, implementations of the successive cumulative rotation algorithm may leverage the coordinate rotation digital computer (CORDIC) hardware architecture for calculating trigonometric functions, thus achieving a single hardware circuit block implementing both trigonometric functions and elementary functions. The reuse of the CORDIC hardware architecture designed for trigonometric functions for the calculation of elementary functions may save circuit area and reduce the system power consumption. The successive cumulative rotation algorithms as described in the disclosure are used to compute certain elementary functions for fixed-point input values and floating-point input values. The successive cumulative rotation algorithms employ a series of iterative steps of rotation operations to approximate the elementary functions with respect to one or more input values. The elementary functions in this disclosure refer to hyperbolic functions $$\left(S(x) = \frac{A^x - A^{-x}}{2}, C(x) = \frac{A^x + A^{-x}}{2}\right),$$

power and logarithm functions ($A^x$, $\log(x)$), reciprocal functions, square root and inverse square root functions etc. These elementary functions are non-trigonometric functions. Because each iterative step of the successive cumulative rotation algorithms involves rotation calculations without invoking multiplication calculations, the circuit supporting implementations can be much simpler and can be realized in a small circuit footprint (i.e., small circuit areas) implemented on a FPGA circuit board.

The input values such as a real number can be represented as fix-pointed numbers or floating-point numbers when calculating the elementary functions. A fixed-point number representation of a real number includes a first fixed number of bits for representing the integer portion of the real number and a second fixed number of bits for the representing the fractional portion of the real number. A n-bit (binary) point number can be thought of as an n-bit integer divided by a scale factor, $2^m$. This is equivalent to treating the number as though there were a radix-point between bits m and m−1. The diagram below assumes an 8-bit number with a scale factor of $2^5$, so the radix point is between bits 5 and 4.

| 7 | 6 | 5 • 4 | 3 | 2 | 1 | 0 |
|---|---|---|---|---|---|---|

In this case, the bit-pattern 0101_1001 is interpreted as the real number $89/32 = 2^{19}/32 = 2.59375$. Fixed-point numbers usually represent negative numbers the same way as integers deal with signed numbers, using 2's complement representation, instead of an explicit sign bit.

The floating-point number representation of a real number includes a sign bit, a fixed number of bits representing significant digits (or significand), and an exponent for scaling the significand. For example, in the IEEE floating-point number representation, a real number is represented as $\pm 1.m * 2^{exp}$, where the mantissa 1.m is a number in the range (1.0 ... 2.0], with fraction m of some fixed number of bits where the number of bits is implementation-dependent. The exponent exp is an integer in a range that is also implementation-dependent. A sign bit is used to indicate the sign (+ or −). In the case of IEEE single precision floating-point, 23 bits are used for the fractional part, m. The exponent exp has range 127 to −126. IEEE floating-point number representation also includes representations of special cases such as denormals and infinities.

The CORDIC algorithm uses rotations rather than multiplications in calculating trigonometric functions, allowing for efficient hardware implementations of calculations of trigonometric functions. Using the calculations of sine (i.e., sin( )) and cosine (i.e., cos( )) functions as an example, the CORDIC algorithm is to compute trigonometric functions sin x and cos x by repeatedly applying the identities. For trigonometric functions, $$\sin(x+y)=\cos(y)[\sin(x)+\tan(y)\cos(x)]$$

$$\cos(x+y)=\cos(y)[\cos(x)-\tan(y)\sin(x)]$$

Choosing $x=\theta_i=\tan^{-1}(2^{-i})$, the above equations can be written as $$\sin(\theta_i+y)=\cos(\theta_i)[\sin(y)+\cos(y)/2^i]$$

$$\cos(\theta_i+y)=\cos(\theta_i)[\cos(y)-\sin(y)/2^i]$$

where the division by $2^i$ can be implemented (for a fixed-point representation) in hardware as a right shift by i times.

A given input angle $\alpha$ can be approximated in the first quadrant as $\alpha_n=\Sigma_{i=0}^n \delta_i\theta_i$, where $\delta_i=\pm 1$. The accuracy of the approximation is determined by the number of terms, n. Given an $\alpha$, the trigonometric function values $\sin \alpha_n$ and $\cos \alpha_n$ can be calculated using the following recurrences:

$$\sin(\delta_i\theta_i+\delta_{i-1}\theta_{i-1}+\cdots+\theta_0)=\cos(\theta_i)[\sin(\delta_{i-1}\theta_{i-1}+\cdots+\theta_0)+\delta_i\cos(\delta_{i-1}\theta_{i-1}+\cdots+\theta_0)/2^i]$$

$$\cos(\delta_i\theta_i+\delta_{i-1}\theta_{i-1}+\cdots+\theta_0)=\cos(\theta_i)[\cos(\delta_{i-1}\theta_{i-1}+\cdots+\theta_0)-\delta_i\sin(\delta_{i-1}\theta_{i-1}+\cdots+\theta_0)/2^i]$$

Note that the calculation of this sequence includes a multiplication by $\cos(\theta_i)$ at each step. This can be avoided by recognizing that these multiplications can be factored out so that there is a single multiplication by the product $K_n=\Pi_{i=0}^n \cos(\theta_i)$. To take advantage of this fact, the recurrence can be rewritten so that:

$$X_0=1/\sqrt{2}$$

$$Y_0=1/\sqrt{2}$$

$$X_i=X_{i-1}+\delta_i Y_{i-1}/2^i$$

$$Y_i=Y_{i-1}-\delta_i X_{i-1}/2^i$$

The $\sin \alpha_n$ and $\cos \alpha_n$ can be recovered by multiplying at the end with $K_n$ so $$\sin(\alpha_i)=K_i X_i$$

$$\cos(\alpha_i)=K_i Y_i$$

If n can be predetermined based on the accuracy of the approximation to $\alpha$, then the final multiplication with $K_n$ can be avoided by instead pre-multiplying with $K_n$. This is equivalent to initializing $X_0$ and $Y_0$ with $K_n$. So, $$X_0=K_n/\sqrt{2}$$

$$Y_0=K_n/\sqrt{2}$$

$$\sin(\alpha_n)=X_n$$

$$\cos(\alpha_n)=Y_n$$

Given an angle $\alpha$ for computing $\sin(\alpha)$ or $\cos(\alpha)$, the CORDIC algorithm includes the calculation of the $\delta_i$ at each step i such that eventual $\alpha_n$ can best approximate $\alpha$. The standard approach is to pick + or − based on whether the current approximation $\alpha_i$ is less than $\alpha$ or not.

As shown, the CORDIC algorithm for calculating sin and/or cos functions involves shift operators (>>) and addition/subtraction operators (+/−) but without multiplication operators. Thus, the CORDIC algorithm can be implemented in small footprint circuits such as FPGA circuits.

Some implementations may use a double rotation $2\theta_i$ rather than a single rotation $\theta_i$. In double rotation, instead of adding $\pm\theta_i$, each step adds $\pm 2\theta_i$.

$$\sin(x+2\theta_i)=\cos^2(\theta_i)[\sin(x)+\delta_i 2\tan(\theta_i)\cos(x)-\tan^2(\theta_i)\sin(x)]$$

$$\cos(x+2\theta_i)=\cos^2(\theta_i)[\cos(x)-\delta_i 2\tan(\theta_i)\sin(x)-\tan^2(\theta_i)\cos(x)]$$

Expanding $\tan(\theta_i)$ provides $$\sin(x+2\theta_i)=\cos^2(\theta_i)[\sin(x)+\delta_i \cos(x)/2^{i-1}-\sin(x)/2^{2i}]$$

$$\cos(x+2\theta_i)=\cos^2(\theta_i)[\cos(x)-\delta_i \sin(x)/2^{i-1}-\cos(x)/2^{2i}]$$

The recurrence relationship for the double rotation is:

$$X_i=X_{i-1}+\delta_i Y_{i-1}/2^{i-1}-X_{i-1}/2^{2i}$$

$$Y_i=Y_{i-1}-\delta_i X_{i-1}/2^{i-1}-Y_{i-1}/2^{2i}$$

In this case, $\alpha_n=\Sigma_{i=0}^n \delta_i 2\theta_i$ and $K_n=\Pi_{i=0}^n \cos^2(\theta_i)$.

$\cos(\theta_i)$ using the double rotation may be calculated as follows:

$$\cos(\theta_i)=1/\sqrt{1+2^{-2i}}$$

$$1/\cos^2(\theta_i)=1+2^{-2i}$$

As to the calculation of $\sin^{-1}(v)$ using CORDIC, the algorithm may choose a series of $\delta_i$ to build $\alpha_n$ such that $\sin(\alpha_n)$ approximates v. The algorithm is to choose + or − for $\delta_{i+1}$ based on whether the $\sin(\alpha_i)$ is less than v or not. To compute $X_i$ and $Y_i$ instead of $\sin \alpha_i$ and $\cos \alpha_i$, this approach may need to be modified to evaluate:

$$\sin(\alpha_i)<v \equiv K_i X_i<v \equiv X_i<v/K_i$$

Now, let $v_i=v/K_i$. In this case, the following recurrence for double rotation CORDIC) can be use.

$$v_i=v/K_i=v_{i-1}/\cos^2(\theta_i)=v_{i-1}(1/\cos^2(\theta_i))$$

Note that for the single rotation CORDIC, the $1/\cos^2(\theta_i)$ term would be replaced by $1/\cos(\theta_i)$, which would need a multiplication to implement. In the double rotation CORDIC, the recurrence for $v_i$ can be simplified as $$v_i=v_{i-1}(1+2^{-2i})$$

that can be implemented using a shift and add.

Correspondingly, the arccos of an input can be computed from the arcsin by using the relation:

$$\cos^{-1}x=\pi/2-\sin^{-1}x$$

In addition to trigonometric functions, practical applications may also invoke non-trigonometric elementary functions in computation. The disclosure provide various implementations of systems and methods for adaptive calculations of these elementary functions by leveraging the hardware implementations of CORDIC recurrences for computing trigonometric functions, thus achieving hardware-efficient calculations of elementary functions. To this end, implementations may first construct CORDIC recurrences for hyperbolic functions, and provide adaptive calculations for other elementary functions using the CORDIC recurrences for hyperbolic functions.

Successive Cumulative Rotation Recurrences for Hyperbolic Functions

Successive cumulative rotation recurrences can be used to evaluate elementary functions. Hyperbolic functions in this disclosure can be represented as $$S(x) = \frac{A^x - A^{-x}}{2}$$

$$C(x) = \frac{A^x + A^{-x}}{2}$$

where A is a real number. If A is the Euler's number e, the corresponding functions are the hyperbolic sine function (sinh( )) and the hyperbolic cosine function (cosh( )). Then the following relations between the hyperbolic functions hold:

$$S_{(x+y)} = S_{(x)} C_{(y)} + C_{(x)} S_{(y)}$$

$$C_{(x+y)} = C_{(x)} C_{(Y)} + S_{(x)} S_{(y)}$$

Introducing an auxiliary function:

$$\mathcal{T}(x) = S(x)/C(x) = \frac{A^x - A^{-x}}{A^x + A^{-x}}$$

Note that the inverse of the auxiliary function is $$\mathcal{T}^{-1}(y) = \frac{\log_A\left(\frac{1+x}{1-x}\right)}{2}$$

For x in the range $-1 \leq x < 1$, the value of x can be approximated as $x \sim x_n = \Sigma_{i=1}^n \delta_i 2\theta_i$, where $T(\theta_i) = 2^{-i}$, starting from i=1. It may not be possible to approximate all values of x since the series as written may not converge $$\Sigma_{j=i+1}^{\infty} \mathcal{T}^{-1}(2^{-j}) < \mathcal{T}^{-1}(2^{-i})$$

Implementations of the disclosure may include modifications to the algorithm so as to satisfy the convergence constraint. The modification may include repetitions of certain terms in the approximation series. The terms to be repeated may depend on the base value A; for A=e, indices k, 3k+1, ..., starting from k=4 (i.e. 4, 13, 40 ...) will be repeated, resulting in a convergent estimate of $x_n$. Thus, when A=e, $$x_6 = \delta_1 2\theta_1 + \delta_2 2\theta_2 + \delta_3 2\theta_3 + \delta_4 2\theta_4 + \delta_4 2\theta_4 + \delta_5 2\theta_5$$

Using i to indicate the index of the term and i' to indicate the actual index value used for $\theta_i$ in that term, the recurrence relations and conversion functions can be derived in a manner similar to those for trigonometric functions. For the double rotation, recurrence relations and conversion functions are:

$$\mathcal{K}_n = \prod_{i=1}^n \{C(\theta_{i'})\}^2$$

$$\mathcal{X}_0 = 0$$

$$\mathcal{Y}_0 = \mathcal{K}_n$$

$$\mathcal{X}_i = \mathcal{X}_{i-1} + \delta_i \mathcal{Y}_{i-1}/2^{i'-1} + \mathcal{X}_{i-1}/2^{2i'}$$

$$\mathcal{Y}_i = \mathcal{Y}_{i-1} + \delta_i \mathcal{X}_{i-1}/2^{i'-1} + \mathcal{Y}_{i-1}/2^{2i'}$$

-continued $$S(x_i) = \mathcal{K}_i \mathcal{X}_i$$

$$C(x_i) = \mathcal{K}_i \mathcal{Y}_i$$

For the single rotation:

$$k_n = \Pi_{i=1}^n C(\theta_{i'})$$

$$x_0 = 0$$

$$\mathcal{Y}_0 = \mathcal{K}_n$$

$$x_i = x_{i-1} + \delta_i \mathcal{Y}_{i-1}/2^{i'}$$

$$\mathcal{Y}_i = \mathcal{Y}_{i-1} + \delta_i x_{i-1}/2^{i'}$$

$$S_{(x_i)} = k_i x_i$$

$$C_{(x_i)} = k_i \mathcal{Y}_i$$

The successive cumulative rotation recurrences are similar to those for calculating trigonometric functions using CORDIC recurrences. Thus, the inner stage of the CORDIC recurrences for calculating trigonometric functions can be reused to calculate the hyperbolic functions.

Power Function

The power function can be represented as $A^x = C(x) + S(x)$. Thus, given the recurrences from the previous section, $A^{x_n} = C(x_n) + S(x_n) = \mathcal{K}_n(\mathcal{X}_n + \mathcal{Y}_n)$. Let $\mathcal{P}_i = \mathcal{X}_i + \mathcal{Y}_i$. Then $$P_0 = \mathcal{K}_n$$

$$P_i = \mathcal{X}_{i-1} + \delta_i \mathcal{Y}_{i-1}/2^{i'-1} + \mathcal{X}_{i-1}/2^{2i'} +$$
$$\mathcal{Y}_{i-1} + \delta_i \mathcal{X}_{i-1}/2^{i'-1} + \mathcal{Y}_{i-1}/2^{2i'}$$
$$= (\mathcal{X}_{i-1} + \mathcal{Y}_{i-1}) + \delta_i(\mathcal{X}_{i-1} + \mathcal{Y}_{i-1})/2^{i'-1} +$$
$$(\mathcal{X}_{i-1} + \mathcal{Y}_{i-1})2^{2i'}$$
$$= \mathcal{P}_{i-1} + \delta_i \mathcal{P}_{i-1}/2^{i'} + \mathcal{P}_{i-1}/2^{2i'}$$

In this way, the power function can be evaluated using the successive cumulative rotation recurrences. In one particular case, the power function to be evaluated is $2^x$. Computing $2^x$ in a floating-point number representation may be achieved as following. Let $|x|=w+f$, where w is the integer part and f is the fractional part of the floating-point number. For a positive value x, $2^x = 2^w * 2^f$ and $2^f = 1+m$, $0 \leq m < 1$. This can be converted to the floating-point number representation, where w becomes the exponent, and m becomes the fraction. For a negative value x, $2^x = 2^{-w} * 2^{-f}$ and $0.5 < 2^f \leq 1$. This can be converted into a floating-point number by using $-(w+1)$ as the exponent and converting $2^f$ to a 1+m format by doubling the result. Alternatively, the negative value x can be represented as $2^x = 2^{-(w+1)} * 2^{(1-f)}$ for non-zero f. Since $2^{1-f} = 1+m$, $0 \leq m < 1$, this allows for converting the result into the floating-point number representation with $-(w+1)$ for the exponent part and m for the fractional part.

The code of successive cumulative rotation recurrences for implementing pow2(a) function for x in range (-1,1) is:

```
M[n] = [ 2, 3, 4, 5, 6, 7, 7, 8, 9, 10, ... ]
pow2(A)
    P = Kn
    xi = 0
    for( i = 0; i < n; i++ )
```

```
    ii = M[i]
    if( ai < A )
        P' = P + ((P<<1)>>ii)+(P>>(2*ii))
        ai = ai + 2*theta[i]
    else
        P' = P - ((P<<1)>>i)+(P>>(2*i))
        ai = ai - 2*theta[i]
    P = P'
return P
```

The Kn and theta[ ] in this code refer to the values derived for Power/Log. M[ ] is used to map the iteration i to the i'; in this code for base 2, the index 7 is repeated.

It is possible for the fractional part to be very small, particularly when the original number is a small number (i.e. w=0). In one implementation, for a small input value, $2^x$ is evaluated using a different approximation, for example, based on the first term of a Taylor expansion of $2^x$ $$e^x \sim 1+x \Rightarrow 2^x \sim 1+\log_e(2)*x$$

So, for small x, $2^x$ can be approximated by $1+x*\log e(2)$. As a result of using the approximation, the calculation of $2^x$ can be further simplified.

Logarithm Function

When a number is represented in a floating-point number representation $x=(1+m)*2^{exp}$, $0 \le m < 1$, then $\log_2(x)=exp+\log_2(1+m)$. The successive cumulative rotation recurrences for evaluating $\log_2(v)$ for v in the range of $1 \le v < 2$ can be based on the pow2( ) code introduced in above by searching for a sequence of $\delta_i$ such that $P_n$ converges on the desired v. The accompanying sum $x_n = \Sigma_{i=1}^n \delta_i 2\theta_i$ in the case of $2^x$ is the desired approximation.

The recurrence $v_i = v_{i-1}/\mathcal{C}^2(\theta_i)$ needs evaluation of $1/\mathcal{C}^2(\theta_i)$.

$$2^{\theta_i} = 2^{\mathcal{T}^{-1}(2^{-i})} = 2^{\log_A\left(\frac{1+2^{-i}}{1-2^{-i}}\right)/2} = \sqrt{2^{\log_A\left(\frac{1+2^{-i}}{1-2^{-i}}\right)}} = \sqrt{\frac{1+2^{-i}}{1-2^{-i}}}$$

$$\mathcal{C}(\theta_i) = \frac{(2^{\theta_i}+2^{-\theta_i})}{2} = \frac{\left(\sqrt{\frac{1+2^{-i}}{1-2^{-i}}} + \sqrt{\frac{1-2^{-i}}{1+2^{-i}}}\right)}{2} = \frac{1}{\sqrt{1-2^{2i}}}$$

So, the recurrence is simplified to $$v_i = v_{i-1}(1-2^{-2i})$$

The code of successive cumulative rotation recurrence for log 2( ) is:

```
log2(V)
    P = 1
    ai = 0
    for( i = 0; i < n; i++ )
        ii = M[i]
        if( P < V )
            P' = P + ((P<<1)>>ii)+(P>>(2*ii))
            ai = ai + 2*theta[i]
        else
            P' = P - ((P<<1)>>ii)+(P>>(2*ii) )
            ai = ai - 2*theta[i]
        P = P'
        V = V - (v>>(2*i))
    return xi
```

When the fractional part m is a small value, instead of using the successive cumulative rotation recurrences, the log(x) can be approximated as following:

$$\log_e(1+x) \sim x \Rightarrow \log_2(1+x) = \log_e(1+x)*\log_2(e) \sim x*\log_2(e)$$

So, for a small value m, the evaluation of log(m) returns $m*\log 2(e)$.

Reciprocal Function

The reciprocal function may be evaluated using the successive cumulative rotation recurrence as described in the following. The calculation of the log 2(v) includes a determination of a series of $\delta_i$ that satisfies $2^{x_n} \cdot v$, $x_n = \Sigma_{i=1}^n \delta_i 2\theta_i$. The corresponding reciprocal function $2^{-x_n}$ may be computed in parallel using the same recurrence but for $-\delta_i$. So, while evaluating the recurrence for $2^{x_n}$:

$$\mathcal{P}_i = \mathcal{P}_{i-1} + \delta_i \mathcal{P}_{i-1}/2^{i'-1} + \mathcal{P}_{i-1}/2^{2i'}$$

and concurrently evaluate for the reciprocal function $2^{-x_n}$:

$$\mathcal{Q}_i = \mathcal{Q}_{i-1} - \delta_i \mathcal{Q}_{i-1}/2^{i'-1} + \mathcal{Q}_{i-1}/2^{2i'}$$

The code of successive cumulative rotation recurrences for reciprocal is:

```
reciprocal(V)
    P = 1
    ai = 0
    Q = Kn
    for( i = 0; i < n; i++ )
        ii = M[i]
        if( P < V )
            P' = P + ((P<<1)>>ii)+(P>>(2*ii))
            Q' = Q - ((Q<<1)>>ii)+(Q>>(2*ii))
            ai = ai + 2*theta[i] # redundant, shown for completeness
        else
            P' = P - ((P<<1)>>ii)+(P>>(2*ii))
            Q' = Q + ((Q<<1)>>ii)+(Q>>(2*ii))
            ai = ai - 2*theta[i] # redundant, shown for completeness
        P = P'
        Q = Q'
        V = V - (V>>(2*ii))
    return Q
```

By restricting v to be between 1 and 2 by only considering the mantissa, the exponent of the result is the negative of the exponent of the input.

If $v=(1+m)*2^{exp}$, $0 \le m < 1$ and m is small, the reciprocal function can be evaluated by the approximation similar to $2^x$ for a small input value:

$$\frac{1}{1+m} \sim 1-m$$

Square Root and Inverse Square Root Functions

Using the double rotation to compute the log 2(v), the series of $\delta_i$ satisfies $2^{x_n} \sim v$, $x_n = \Sigma_{i=1}^n \delta_i 2\theta_i$. Implementations may also concurrently calculate $2^{x_n/2}$ by using the single rotation with the same $\delta_i$, or calculate $2^{-x_n/2}$ by using the single rotation with $-\delta_i$. These correspond to the square root and inverse square root of v, respectively.

When using the single rotation to compute 2x, the successive cumulative rotation recurrence used is:

$$q_i = q_{i-1} + \delta_i q_{i-1}/2^{i'}$$

the code of successive cumulative rotation recurrences for computing square root function is:

```
sqrt(vV)
   P = 1
   ai = 0
   q = kn # single rotation
   for( i = 0; i < n; i++ )
      ii = M[i]
      if( P < V )
         P' = P + ((P<<1)>>ii)+(P>>(2*ii))
         q' = q + (q>>ii)
         ai = ai + 2*theta[i]   # redundant, shown for completeness
      else
         P' = P − ((q<<1)>>ii)+(P>>(2*ii))
         q' = q − (q>>ii)
         ai = ai − 2*theta[i]   # redundant, shown for completeness
      P = P'
      q = q'
      V = V − (V>>(2*ii))
   return q
```

The inverse square root function can be calculated in a similar manner using an opposite rotation:

```
invsqrt(V)
   P = 1
   ai = 0
   q = kn # single rotation
   for( i = 0; i < n; i++ )
      ii = M[i]
      if( P < V )
         P' = P + ((P<<1)>>ii)+(P>>(2*ii))
         q' = q − (q>>ii)
         ai = ai + 2*theta[i]   # redundant, shown for completeness
      else
         P' = P − ((q<<1)>>ii)+(P>>(2*ii))
         q' = q + (q>>ii)
         ai = ai − 2*theta[i]   # redundant, shown for completeness
      P = P'
      q = q'
      V = V − (V>>(2*ii))
   return q
```

The exponent in these cases is half the exponent of the input (negated in the case of inverse square root). If the exponent is an odd number, the mantissa (v) is treated as being in range $0.5 \le v < 1$, otherwise it is treated as being in the range $1 \le v < 2$. In the case of square root, for odd exponents, the exponent is incremented prior to halving, to take the adjustment to the mantissa range into account.

If $v=(1+m)*2^{exp}$, $0 \le m < 1$ and m is small, an approximation using the first term of Taylor expansion can be used:

$$(1+m)^{\pm \frac{1}{2}} \sim 1 \pm \frac{m}{2}$$

Note that this applies if the exponent is an even number. If the exponent is an odd number, v is treated in range [0.5, 1]. For odd exponents, v is modeled as $v=(1-m')*2^{exp+1}$, $0 \leftarrow m' < 1$. For small m', an approximation using the first term of Taylor expansion can be used:

$$(1-m)^{\pm \frac{1}{2}} \sim 1 \mp \frac{m}{2}$$

The above sections include the description of fixed-point successive cumulative rotation. In a fixed-point implementation, there are a fixed number of bits after the radix point, limiting the number of bits of precision available. If there are N bits after the radix point, the granularity of number that can be represented is $2^{-N}$. This generally means that $x^{N+1}$ can be an exact representation of the number, resulting in very good numerical evaluation of the elementary functions described above. Thus only a small number (N) of steps of the recurrence need to be evaluated, depending on the number of bits used for the precision.

Compared to the fixed-point number representation, the floating-point number representation, however, includes an exponent that can be very small such as $2^{-126}$ for non-denormal IEEE single precision floating-point numbers or $2^{-1022}$ for double precision floating-point numbers. The smallest granularity that can be represented is so small that it would require a very large number of steps of the recurrence to be evaluated if the fixed-point successive cumulative rotation is used to evaluate the elementary functions with a floating-point input value. On the other hand, if only a small number of bits are used to represent the small floating-point number, the relative error can be very large although the absolute error can be small. For example, if 31 bits (based $2^{-31}$) is used to represent a floating-point number in the level of $2^{-55}$ base, the relative error can be as high as $2^{24}$ which may mean that the all the bits in the mantissa of the evaluated elementary functions are incorrect. Thus, it is not hardware-efficient or accurate to apply the fixed-point successive cumulative rotation algorithm directly to floating-point number representations when the input value is very small.

Instead of the directly application of fixed-point successive cumulative rotation to floating-point number representations, implementations of the disclosure first determine whether the floating-point input value is small. Responsive to determining that the floating-point input value is not small, implementations may employ the successive cumulative rotation algorithm to calculate elementary functions. Responsive to determining that the floating-point input value is small, implementations may employ an approximation approach to calculate elementary functions. Thus, the values of elementary functions can be evaluated in an adaptive manner. One implementation of the disclosure may use the first term of the Taylor series expansions as the approximation of the elementary functions with a small floating-point input. The first term of the Taylor expansion of elementary functions are discussed in the above. In one implementation, instead of just the first term of the Taylor series, the approximation for the small input value α may also include the second term (or more terms) of the Taylor series. Because the input value is a small floating-point number, the multiplication result of the higher-order terms (second order or above) may be represented using fewer bits (e.g., 8 bits) while the multiplication circuits for the small floating-point input values can be a low-bit (e.g., 4 or 5 bits) multiplication circuits which are cheaper to implement compared to the standard 16-bit or 32-bit multiplication circuits.

FIG. 1 illustrates a system 100 for performing the calculation of elementary functions according to an implementation of the disclosure. As shown in FIG. 1, system 100 may include a hardware processor 102 and a co-processor 104. Processor 102 can be a central processing unit (CPU), a graphic processing unit (GPU), or any suitable types of processing devices. Processor 102 may include an instruction execution pipeline (not shown), a register file (not shown), and circuits implementing instructions specified according to an instruction set architecture (ISA) 106. The instructions may include instructions for calculating fixed-point and/or floating-point elementary functions. In one implementation, processor 102 may execute an application 108 using the execution pipeline. The application may include executable code of a program designed to solve a practical problem such as a medical imaging problem or a machine learning problem. Application 208 when executed may include calls to elementary functions 110.

In one implementation, system 100 may provide a co-processor (or accelerator circuit) 104 with designated circuits to support the calculation of elementary functions 110. Co-processor 104 can be part of processor 102 or a separate logic circuit communicatively connected to processor 102. For example, co-processor 104 can be an accelerator circuit implemented on a FPGA board to accelerate the calculation of elementary functions. Co-processor 104 may include a register file 118, a determination circuit 112, an approximation circuit 114, and a reconfigurable successive cumulative rotation recurrence circuit 116.

Register file 118 may include instruction registers 120 and data registers 122. Instruction registers 120 may receive instructions from the execution pipeline of processor 102 executing elementary function 110 and store the instructions therein. In one implementation, the instructions may include calculation instructions for evaluating elementary functions with respect to an input value. Data registers 122 may store input values and output values associated with a corresponding an elementary function calculation instruction. In one implementation, data registers 222 may include fixed-point data registers and floating-point data registers that may correspondingly store fixed-point and floating-point input values and floating-point output values. The execution pipeline of processor 102 may store the input values associated with an elementary function calculation in data registers 122 and retrieve the results of executing the elementary function calculation from data registers 122.

Determination circuit 212 may identify an instruction for calculating an elementary function from instruction register 220 and a corresponding input value associated with the instruction from data register 222. Responsive to identifying the instruction including the input value, determination circuit 212 may parse the instruction and the input value, and further determine whether the input value is a small value or within a small value range. As discussed above, the determination circuit 212 may determine whether the input value is a small value based on one or more factors including, but not limited to, estimated absolute errors, estimated relative errors, types of the elementary functions, types of floating-point number representations, and the hardware constraints. Determination circuit 212 may include a switch circuit (e.g., a multiplexer) that may route the input value based on the determination of whether the input value is a small value.

Determination circuit 112 may identify an instruction stored in instruction registers 120, and further determine which elementary function to be evaluated based on the instruction. The elementary functions may include the power function, the logarithm function, the reciprocal function, the square root function, and the inverse square root function as described above. Determination circuit 112 may also receive a corresponding input value associated with the instruction from data register 122 and determine the appropriate circuit blocks and configurations to evaluate the elementary function.

Figure 2:
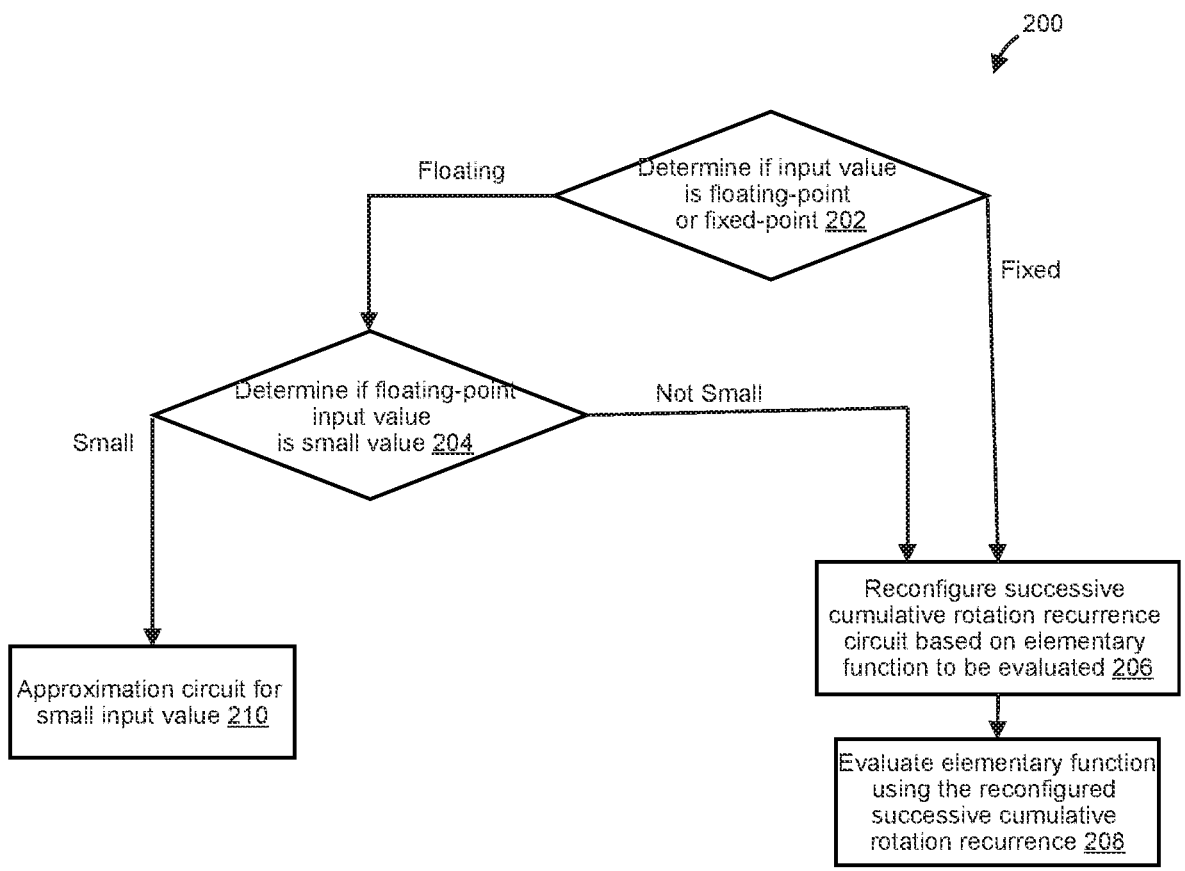
FIG. 2 illustrates a flow diagram for determining and configuring the elementary calculation circuits according to an implementation of the disclosure.

FIG. 2 illustrates a flow diagram 200 for determining and configuring the elementary calculation circuits according to an implementation of the disclosure. As shown in FIG. 2, at 202, determination circuit 112 may receive the input value and determine whether the input value a floating-point value or a fixed-point value. The determination may be based on the identification of the instruction that may indicate the type of the input value. Responsive to determining that the input value is a fixed-point number, at 206, determination circuit 112 may reconfigure the successive cumulative rotation recurrence circuit 116 (as shown in FIG. 1) to a circuit configuration that can evaluate the elementary function specified by the received instruction. At 208, reconfigurable successive cumulative rotation recurrence circuit 116 may perform calculation using the successive cumulative rotation recurrences with respect to the fixed-point input value to obtain an evaluation of the elementary function.

Responsive to determining that the input value is a floating-point number, at 204, determination circuit 112 may further determine whether the input value is a small value. The determination circuit 212 may determine whether the input value is a small value based on one or more factors including, but not limited to, estimated absolute errors, estimated relative errors, types of the elementary functions, types of floating-point number representations, and the hardware constraints.

Responsive to determining that the input value is a small value, at 210, determination circuit 112 may route the input value to approximation circuit 114 for evaluating an approximation of the elementary function. In one implementation, the approximation of the evaluation function is the first term of the Taylor expansion of the evaluation function as discussed above in conjunction with different elementary functions. In this way, determination circuit 112 may determine the most appropriate way to calculate the elementary function identified in the instruction received from processor 102.

Figure 3:
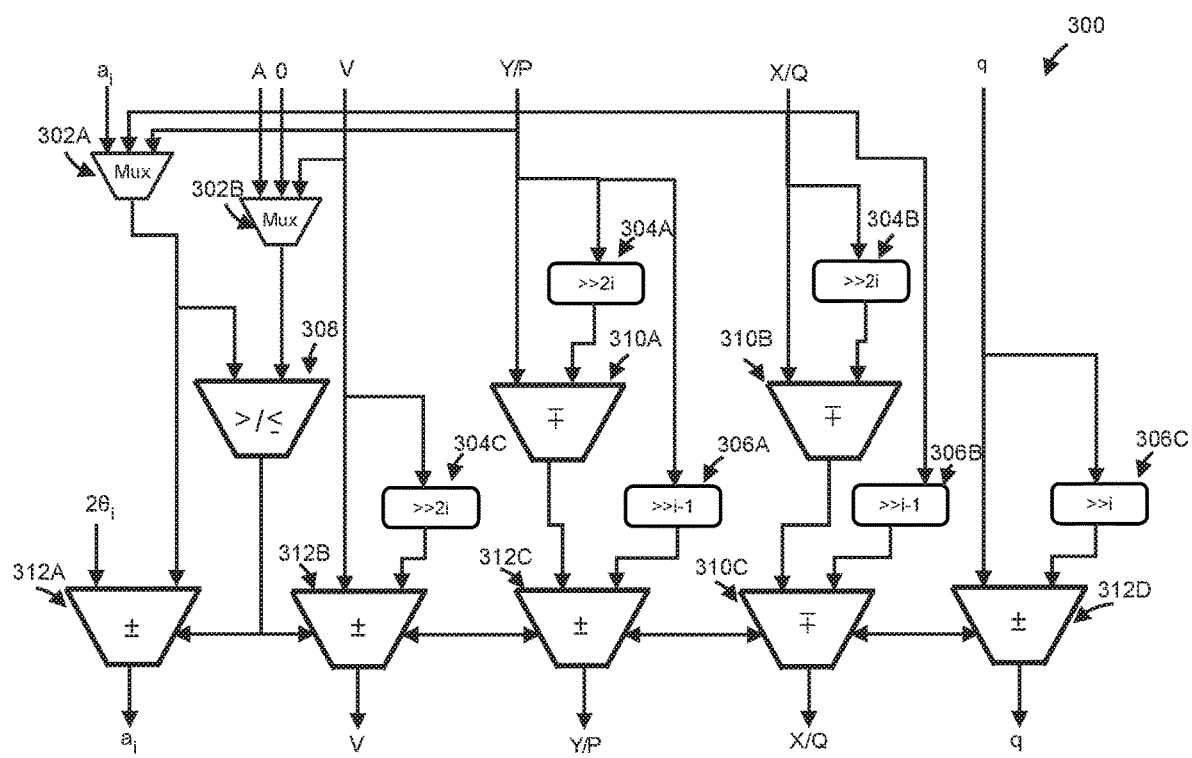
FIG. 3 shows the inner stage of the successive approximation circuit including loops for each of the operations to be combined into a single block according to an implementation of the disclosure.

Referring to FIG. 1, the reconfigurable successive cumulative rotation recurrence circuit 116 may include inner stage of the successive cumulative rotation recurrences that may be reconfigured to perform the recurrences for different elementary functions including the power function, the logarithm function, the reciprocal function, the square root function, and the inverse square root function. The inner stage of the successive cumulative rotation recurrences for each of the operations can be combined into a single block. FIG. 3 shows the inner stage 300 of the successive cumulative rotation circuit including loops for each of the operations to be combined into a single block according to an implementation of the disclosure. Depending on the elementary function or trigonometric function being computed, different parts of the block may be activated.

As shown in FIG. 3, inner stage 300 may include logic circuits of multiplexers 302A, 302B, double right shifters 304A-304C, single right shifter 306A-306C, a comparator 308, subtraction/summation circuits 310A-310C, and summation/subtraction circuits 312A-312D. Inner stage 300 may perform one successive cumulative rotation recurrence for step i. The inputs to the inner stage 300 may include $a_i$, V, Y (or P), X (or Q), and q, where the selection of Y or P, X or Q depends on the function to evaluated as described above. The first stage may also include constant values A (the base) and 0. After each recurrence interaction, the inner stage 300 may generate outputs including $a_i$, V, Y (or P), X (or Q), and q that may be used as the inputs for the next stage i+1.

Certain components of inner stage 300 may be reconfigured to implement different elementary functions and/or trigonometric functions. In particular, comparator 308 is configured to be a greater comparator (">") except for arctan function. In the arctan function case, comparator 308 is configured to be a lesser or equal comparator ("≤"). Summation/subtraction circuit 312B is configured to evaluate trigonometric functions, but is configured as a subtraction/summation circuit for the evaluation of power function and logarithmic functions. Subtraction/submission circuits 310A, 310B are configured to evaluate trigonometric functions, but are configured as summation/subtraction circuits for the evaluation of power function and logarithmic functions. Multiplexers 302A, 302B may select $a_i$/A for trigonometric/hyperbolic functions, and select Y/V for power/logarithmic functions. The index value i for shifters 304A, 304C, 306A are sequential for trigonometric functions, but include repeating terms as described above for power functions and logarithmic functions.

An example of using inner stage 300 to implement the sincos(A) function. The inner stage for sincos(A) is:

```
if( ai < A )
    Y' = Y + ((X<<1)>>i)−(Y>>(2*i))
    X' = X − ((Y<<1)>>i)−(X>>(2*i))
    ai = ai + 2*theta[i]
else
    Y' = Y − ((X<<1)>>i)−(Y>>(2*i))
    X' = X + ((Y<<1)>>i)−(X>>(2*i))
    ai = ai − 2*theta[i]
    Y = Y'
    X = X'
return (Y,X)
```

The inner loop may receive $a_i$, X, Y into the inner loop and compute the new value of $a_i$, X, Y, using constants 2*theta and A in the inner loop. The inner stage 300 as shown in FIG. 3 can be configured to implement this inner loop of sincos (A). The $a_i$, X, Y, enter at the top as do A and 2*theta[i]. V and q are ignored by multiplexers 302A, 302B. The multiplexer 302A is used to select ai while the multiplexer 302B is configured to select A. The comparator 308 is set to <, so it implements ai<A. The multiplexers are then used to dynamically control the ai, Y, and X summation/subtract blocks. Also, logic blocks 310A, 310B are configured to be subtraction.

By expanding, the inner stage is equivalent to

```
if( ai < A )
    ai = ai + theta[i]
    Y = ( Y − (Y>>2i) ) + (X>>(i−1))
    X = ( X − (X>>2i) ) − (Y>>(i−1))
else
    ai = ai − theta[i]
    Y = ( Y − (Y>>2i) ) − (X>>(i−1))
    X = ( X − (X>>2i) ) + (Y>>i−1))
``` which is implemented by inner stage 300. Other elementary functions and/or trigonometric functions can be similarly implemented using the inner stage 300.

Another implementation may include different hardware blocks for each of the N successive cumulative rotation stages. In yet another implementation, the successive cumulative rotation may be implemented by using one block N times. In this case, the shift values and the 2θ value will have to be selected differently for each iteration. A complex shifter, such as a barrel shifter, may be used since ~N shift values are possible. Depending on the function being computed, different parts of the block can be activated.

Figure 4:
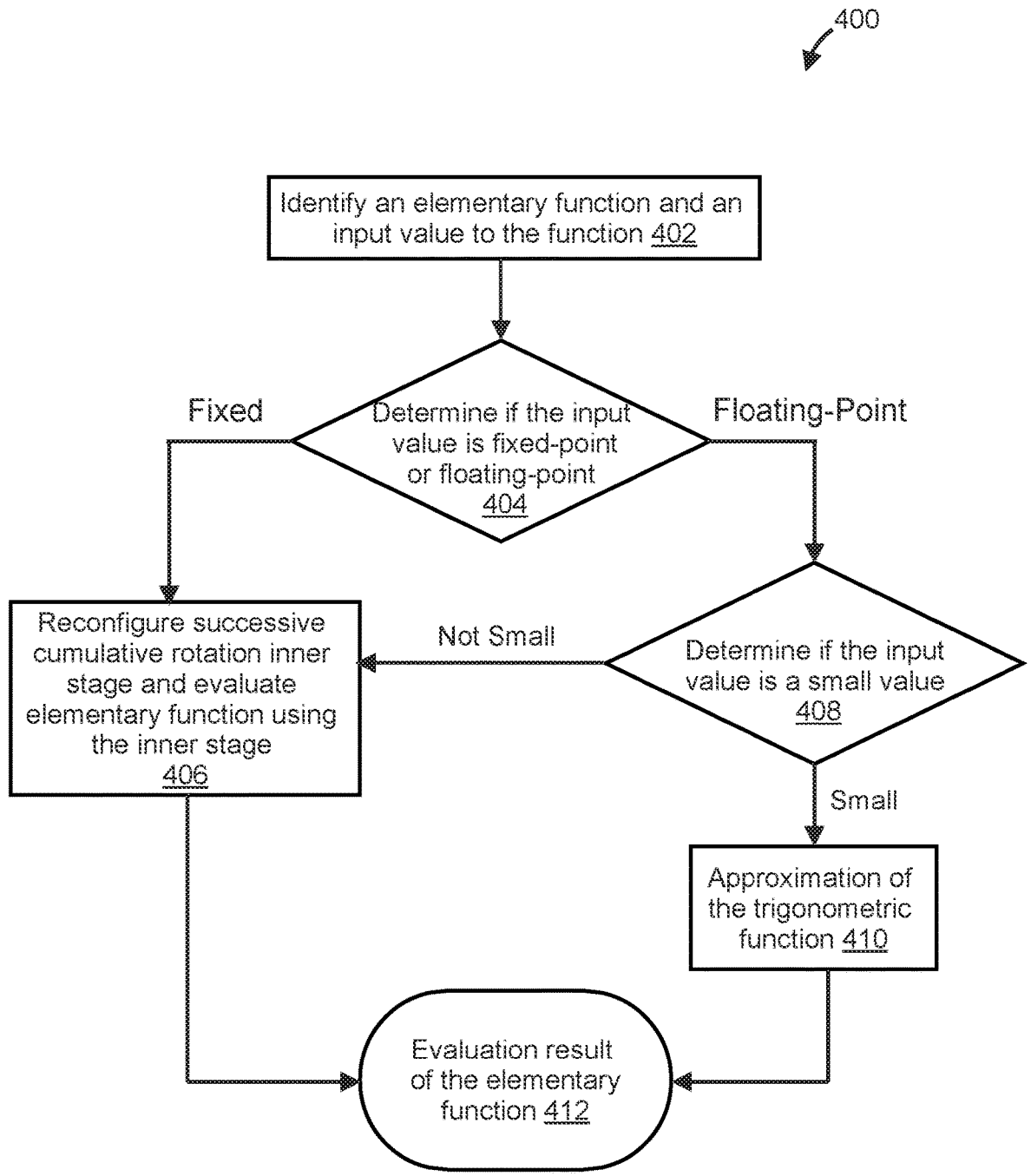
FIG. 4 illustrates a flow diagram of a method for adaptively evaluating an elementary function according to an implementation of the disclosure.

FIG. 4 illustrates a flow diagram of a method 400 for adaptively evaluating an elementary function according to an implementation of the disclosure. Referring to FIG. 4, method 400 may be implemented on a processing device such as a hardware processor 102 or an accelerator circuit 104 as shown in FIG. 1 (collectively, referred to as a processing logic). At 402, the processing logic may identify an elementary function and an input value to the elementary function. The processing logic may identify the elementary function and the input value through an instruction executed by the processing logic. The input value can be represented in a fixed-point number representation or a floating-point number representation.

At 404, the processing logic may determine whether the input value is a fixed-point value or a floating-point value. The processing logic may make the determination based on the identifier of the instruction defined in the instruction set architecture (ISA) 106 as shown in FIG. 1.

Responsive to determining that the input value is in the fixed-point number representation, at 406, the processing logic may reconfigure the successive cumulative rotation inner stage (e.g., as described and shown in FIG. 3) to a circuit configuration corresponding to the identified elementary function, and further perform the evaluation of the elementary function using the successive cumulative rotation recurrences supported by the reconfigured successive cumulative rotation inner stage circuit.

Responsive to determining that the input value is represented using the floating-point number representation, at 408, the processing logic may further determine whether the input value is a small value and based on the determination to evaluate the elementary function. The determination of whether the input value is small may be based on one or more factors including, but not limited to, estimated absolute errors, estimated relative errors, types of the elementary functions, types of floating-point number representations, or the hardware constraints. In one implementation, the determination of whether the floating-point input value can be based on an estimated absolute error. For example, a target bound of the estimated absolute error may be represented by a number (N) of bit (e.g., $2^{-N}$). Thus, a floating-point input value smaller than the target bound of the estimated absolute error (e.g., $2^{-N}$) is determined to be small; a floating-point input value that is in the range or larger than the target bound is determined to be not small.

Similarly, in another implementation, the determination of whether the floating-point input value can be based on an estimated relative error. For example, a target bound of the estimated relative error. Current implementations of CORDIC are fixed-point algorithms. An n-step CORDIC algorithm may have a residual error of $k2^{-n}$. For floating-point number representations, however, the residual errors are in a range that is determined by the size of the exponent. In the case of single-precision numbers, the exponent can be as small as $2^{-149}$. Covering this range using purely a CORDIC approach would require approximately 149 steps. Using the first term of Taylor expansion as an approximation to a small input value may reduce the complexity of the calculation.

As discussed above, instead of performing the successive cumulative rotation algorithm, the first term (or optionally, second or higher terms) of Taylor expansion can be used as the approximation of an elementary function for small input values. The residual errors for using the first term of Taylor expansions to approximate the elementary functions depend on the function themselves. For example, the residual terms for power functions, logarithm functions, reciprocal functions, square root functions, and the inverse of the square root functions are in the order of $x^2$, where x is the input value. These bounds of the residual errors may be used to determine the bounds of absolute errors or relative errors, thereby determining whether the input value is small. Thus, the threshold of whether an input value is small can be determined based on the types of the elementary functions.

For a small input value, it is more advantageous to use if an error in the last 2k+1 bits is acceptable, then for single precision, the cutoff between a small value and a non-small value can be set at $2^{-11+k}$. This will keep the error in the desired range. Then, the successive cumulative rotation algorithm only needs 34-3k steps—the smallest result generated is $2^{-11+k}$, and the smallest bit position which needs to be accurate is at 24-2k. So, a 5 least significant bit (LSB) error is acceptable, the cutoff can be set at $2^{-9}$, and the successive cumulative rotation algorithm needs at most 25 steps.

Responsive to determining that the input value is not a small value, at 406, the processing logic may convert the input value to a fixed-point number representation, and reconfigure the successive cumulative rotation inner stage (e.g., as described and shown in FIG. 3) to a circuit configuration corresponding to the identified elementary function, and further perform the evaluation of the elementary function using the successive cumulative rotation recurrences supported by the reconfigured successive cumulative rotation inner stage circuit.

Responsive to determining that the input value is a small value, at 410, the processing logic may calculate an approximation of the elementary function with respect to the small input value. In one implementation, the approximation to the elementary functions with a small floating-point input value is the first term of Taylor expansion. Using the approximation may further simplify the calculation of elementary functions by reducing the number of successive cumulative rotation recurrences to a reasonable number.

At 412, the processing logic may generate the result for evaluating the elementary functions. For a floating-point input value, the processing logic may convert the fixed-point result generated by the successive cumulative rotation inner stage 300 back to the corresponding floating-point number representation. The processing logic may store the evaluation result in data registers 122 as shown in FIG. 1.

Standard IEEE floating-point representations include representations of special values such as +/−Infinity, signaling and quiet NaNs, and denormals. In addition, IEEE floating-point representations can identify certain exceptions, specifically INVALID, OVERFLOW, UNDERFLOW, DIVIDE-BY-ZERO and INEXACT. The table below summarizes the actions recommended for the operations.

TABLE 1

| Operation | Input | Result | Exception |
|---|---|---|---|
| sin/cos | ±Infinity | quiet NaN | INVALID |
| asin | >1.0, +Infinity | quiet NaN | INVALID |
|  | <−1.0, −Infinity | quiet NaN | INVALID |
| $2^x$ | −Infinity | 0 |  |
|  | +Infinity | +Infinity |  |
|  | ≥MAX_EXP | +Infinity | OVERFLOW |
|  | <MIN_DENORM | 0 | UNDERFLOW |
| $\log_2$ | 0 | −Infinity |  |
|  | <0, −Infinity | quiet NaN | INVALID |
|  | +Infinity | +Infinity |  |
| reciprocal | 0 | quiet NaN | DIVIDE-BY-ZERO |
|  | ±Infinity | ±0 |  |
|  | ≤$2^{-MAX\_EXP}$ | +Infinity | OVERFLOW |
| square root | <0, −Infinity | quiet NaN | INVALID |
|  | +Infinity | +Infinity |  |

TABLE 1-continued

| Operation | Input | Result | Exception |
|---|---|---|---|
| inverse square root | 0 | quiet NaN | DIVIDE-BY-ZERO |
|  | <0, −Infinity | quiet NaN | INVALID |
|  | +Infinity | 0 |  |

MAX_EXP, MIN_DENORM depend on format; for single precision 128/−149 respectively.

To take into consideration of special input values as shown in Table 1, when computing one of the elementary functions, the method and the system may include:
   Determining that the input value is a special case specified in Table 1, and applying the corresponding rules to compute the result including possibly generating an exception;
   Determining that the input falls into the range where the approximation algorithm is to be used, use the approximation to compute the result;
   otherwise using the successive cumulative rotation algorithm.

Using the successive cumulative rotation algorithm to compute elementary functions involves the following steps:
   Normalizing the input to extract the number that is used as input to successive cumulative rotation algorithm, and in particular, for sin/cos functions, extracting the integer and fractional parts of the input number;
   Performing N stages of the successive cumulative rotation algorithm to get approximation, where N is determined based on the number of bits representing the fractional part;
   Generating the evaluation results for elementary functions.

In one implementation of the disclosure, the floating-point input value to the elementary functions can be IEEE single precision, double precision, quadruple precision, or octuple precision floating-point number. For a single precision implementation, the fixed-point numbers are represented with as 61 bit numbers, with α 59 bits after the (implicit) radix point.

For this implementation, the calculation of Pow2 (base 2 power) functions may include the following operations:
   responsive to determining that the input value is +Infinity input value, set the output to +Infinity;
   responsive to determining that the input value is −Infinity input value, set the output to 0.0;
   responsive to determining that the input value is 0.0, set the output to 1.0;
   split the input v into whole number w and fraction f,
   If w≥128 ($2^v$ is not representable in single precision), set the output to +Infinity;
   If w≤−150 ($2^v$ is not representable in single precision), set the output to −Infinity;
   If w<−126, the result is a denormal number
   If f<$2^{-9}$, use the small value approximation, where fractional part of result is ln(2)*f;
   Otherwise, convert f to a fixed point number and run appropriate successive cumulative rotation variant to get fractional part of evaluation result;
   Convert to floating point value using fractional part of result to define mantissa and w for the exponent of the result.

For Log 2 function:
   responsive to determining that the input value is +Infinity, set the output to +Infinity;
   responsive to determining that the input value is 0.0, set the output to −Infinity;

responsive to determining that the input value is a negative value (out of range), set the output to NaN;
responsive to determining that the input value is 1.0, set the output to 0.0;
let $v=1.m*2^{exp}$, where
this is the natural format for a non-denormal floating point number
a denormal number can be normalized into this format
m is 23 bits in single precision
if $m<2^{16}$, compute $r=\log_2(1+m)$ using small value approximation m/ln(2)
otherwise convert 1.m to a fixed point number and use appropriate successive cumulative rotation algorithm to compute $r=\log_2(1+m)$.
if exp is non-zero, scale and add r to exp to obtain a result; otherwise r is result
convert the result back to floating point.
For a reciprocal function:
responsive to determining that the input value is ±Infinity, set the output correspondingly to ±0.0;
responsive to determining that the input value is ±0.0, set the corresponding output to ±Infinity;
if input $|v|<2^{-127}$ (then result is not representable), set the output to ±Infinity;
let $v=1.m*2^{exp}$
if m=0, then set the output to $2^{-exp}$;
otherwise, convert 1.m to fixed point representation and run appropriate successive cumulative rotation variant;
convert the output to floating-point representation and subtract exp.
For a square root function:
responsive to determining that the input value is +Infinity, set the output to +Infinity;
responsive to determining that the input value is ±0.0, set the output to 0;
responsive to determining that the input value is a negative input value (which is out of range), set the output to NaN;
let $v=1.m*2^{exp}$ for even exp and $v=0.1m*2^{exp+1}$ for odd exp while let f=1.m/0.1m for the both even and odd cases;
for $m<2^{10}$ in even exp, use the small value approximation (1+(m>>1));
otherwise convert fractional part to fixed point representation and run appropriate successive cumulative rotation algorithm;
convert fractional part to floating point number and set exponent to $\lceil exp/2 \rceil$.
For an inverse square root function:
responsive to determining that the input value is +Infinity, set the output to 0.0;
responsive to determining that the input value is ±0.0, set the output to +Infinity;
responsive to determining that the input value is a negative value (out of range), set the output to NaN;
let $v=1.m*2^{exp}$ for even exp and $v=0.1m*2^{exp+1}$ for odd exp while let f=1.m/0.1m for the both even and odd cases;
for $m<2^{10}$ in even exp, use small value approximation (1−(m>>1));
otherwise convert fractional part to fixed point representation and run appropriate successive cumulative rotation algorithm;
convert fractional part to floating point number and set exponent to $-\lfloor exp/2 \rfloor$.
While the disclosure has been described with respect to a limited number of implementations, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the present disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:
1. An accelerator circuit, comprising:
a register file comprising:
instruction registers to store an instruction for evaluating an elementary function; and
data registers comprising a first data register to store an input value associated with the instruction;
a successive cumulative rotation circuit comprising a reconfigurable inner stage to perform a successive cumulative rotation recurrence;
a determination circuit to:
determine a type of the elementary function based on the instruction; and
responsive to determining that the input value is a fixed-point number, configure the reconfigurable inner stage to a configuration for evaluating the type of the elementary function, wherein the successive cumulative rotation circuit is to calculate an evaluation of the elementary function using the reconfigurable inner stage performing the successive cumulative rotation recurrence; and
an approximation circuit, wherein the determination circuit is further to:
responsive to determining that the input value is a floating-point number,
determine whether the input value belongs to a small value range;

responsive to determining that the input value is outside the small value range,
convert the floating-point number into a fixed-point number; and
configure the reconfigurable inner stage to the configuration for evaluating the type of the elementary function, wherein the successive cumulative rotation circuit is to calculate the evaluation of the elementary function using the reconfigurable inner stage performing the successive cumulative rotation recurrence; and
wherein the approximation circuit is to:
responsive to determining that the input value belongs to the small value range, receive the input value and calculate an approximation of the elementary function with respect to the input value.

2. The accelerator circuit of claim 1, wherein the type of the elementary function comprises at least one of a power function, a logarithm function, a reciprocal function, a square root function, or an inverse square root function, and wherein the successive cumulative rotation recurrence comprises at least one of a single rotation operation with respect to the input value or a double rotation operation with respect to the input value.

3. The accelerator circuit of claim 1, wherein to determine whether the input value is in a small value range, the determination circuit is to determine whether the input value is in the small value range based on at least one of an estimated absolute error, an estimate relative error, a type of the elementary function, a type of floating-point number representation used for the floating-point input value, or a hardware constraint by the successive cumulative rotation circuit.

4. The accelerator circuit of claim 1, wherein the successive cumulative rotation circuit is to repeat at least one of the successive cumulative rotation recurrence, and wherein the floating-point input value is represented according to an IEEE floating-point number representation.

5. The accelerator circuit of claim 1, wherein to calculate an approximation of the elementary function with respect to the input value, the approximation circuit is to:
calculate the approximation of the elementary function using at least one of a first term or a second term of a Taylor expansion of the elementary function; and
store the approximation in a second data register of the data registers.

6. The accelerator circuit of claim 1, wherein the successive cumulative rotation circuit is further to convert the evaluation of the elementary function into a floating-point number representation, and store the floating-point evaluation in a third data register of the data registers.

7. The accelerator circuit of claim 1, wherein the reconfigurable inner stage comprises at least one of a multiplexer, a reconfigurable comparator, a shifter, a double shifter, a summation circuit, or a subtraction circuit.

8. The accelerator circuit of claim 7, wherein responsive to determining that the type of the elementary function is one of the power function, the logarithm function, the reciprocal function, the square root function, or the inverse square root function, the determination circuit is to configure the reconfigurable comparator to a first mode; and
responsive to determining that the type of the elementary function is a trigonometric function, the determination circuit is to configure the reconfigurable comparator to a second mode.

9. The accelerator circuit of claim 1, wherein responsive to determining that the input value is outside the small value range, to calculate an evaluation of the elementary function using the reconfigurable inner stage performing the successive cumulative rotation recurrence, the successive cumulative rotation circuit is further to:
split the floating-point input value into a whole number part and a fractional number part;
convert the fractional number part into a fixed-point number;
calculate, using the successive cumulative rotation recurrences, the elementary function with respect to the fixed-point number to generate a fixed-point result;
convert the fixed-point result into a floating-point result; and
convert to a floating-point output using the floating-point result and the whole number part.

10. A computing system, comprising:
a storage device to store an input value;
a processor to execute an application comprising an instruction for evaluating an elementary function with respect to the input value;
an accelerator circuit, communicatively coupled to the processor, comprising:
a successive cumulative rotation circuit comprising a reconfigurable inner stage to perform a successive cumulative rotation recurrence; and
a determination circuit to:
receive the instruction and the input value;
determine a type of the elementary function based on the instruction; and
responsive to determining that the input value is a fixed-point number, configure the reconfigurable inner stage to a configuration for evaluating the type of the elementary function, wherein the successive cumulative rotation circuit is to calculate an evaluation of the elementary function using the reconfigurable inner stage performing the successive cumulative rotation recurrence; and
an approximation circuit, wherein the determination circuit is further to:
responsive to determining that the input value is a floating-point number, determine whether the input value belongs to a small value range;
responsive to determining that the input value is outside the small value range,
convert the floating-point number into a fixed-point number; and
configure the reconfigurable inner stage to the configuration for evaluating the type of the elementary function, wherein the successive cumulative rotation circuit is to calculate the evaluation of the elementary function using the reconfigurable inner stage performing the successive cumulative rotation recurrence; and
wherein the approximation circuit is to:
responsive to determining that the input value belongs to the small value range, receive the input value and calculate an approximation of the elementary function with respect to the input value.

11. The computing system of claim 10, wherein the type of the elementary function comprises at least one of a power function, a logarithm function, a reciprocal function, a square root function, or an inverse square root function, and wherein the successive cumulative rotation recurrence comprises at least one of a single rotation operation with respect to the input value or a double rotation operation with respect to the input value.

12. The computing system of claim 10, wherein to determine whether the input value is in a small value range, the determination circuit is to determine whether the input value is in the small value range based on at least one of an estimated absolute error, an estimate relative error, a type of the elementary function, a type of floating-point number representation used for the floating-point input value, or a hardware constraint by the successive cumulative rotation circuit.

13. The computing system of claim 10, wherein to calculate an approximation of the elementary function with respect to the input value, the approximation circuit is to:
    calculate the approximation of the elementary function using at least one of a first term or a second term of a Taylor expansion of the elementary function; and
    store the approximation in a second data register of the data registers.

14. The computing system of claim 10, wherein the successive cumulative rotation circuit is further to convert the evaluation of the elementary function into a floating-point number representation, and store the floating-point evaluation in a third data register of the data registers, and wherein the floating-point input value is represented according to an IEEE floating-point number representation.

15. The computing system of claim 10, wherein the reconfigurable inner stage comprises at least one of a multiplexer, a reconfigurable comparator, a shifter, a double shifter, a summation circuit, or a subtraction circuit.

16. The computing system of claim 15, wherein responsive to determining that the type of the elementary function is one of the power function, the logarithm function, the reciprocal function, the square root function, or the inverse square root function, the determination circuit is to configure the reconfigurable comparator to a first mode; and
    responsive to determining that the type of the elementary function is a trigonometric function, the determination circuit is to configure the reconfigurable comparator to a second mode.

17. The computing system of claim 10, wherein responsive to determining that the input value is outside the small value range, to calculate an evaluation of the elementary function using the reconfigurable inner stage performing the successive cumulative rotation recurrence, the successive cumulative rotation circuit is further to:
    split the floating-point input value into a whole number part and a fractional number part;
    convert the fractional number part into a fixed-point number;
    calculate, using the successive cumulative rotation recurrences, the elementary function with respect to the fixed-point number to generate a fixed-point result;
    convert the fixed-point result into a floating-point result; and
    convert to a floating-point output using the floating-point result and the whole number part.

18. A method for adaptively calculating an elementary function with respective to an input value; the method comprising:
    identifying, by an accelerator circuit from an instruction register and a data register, the elementary function and the input value;
    determining whether the input value is a fixed-point input value or a floating-point input value;
    responsive to determining that the input value is the fixed-point input value,
    determining a type of the elementary function;
    configuring a reconfigurable inner stage of a successive cumulative rotation circuit to a configuration for evaluating the type of the elementary function; and
    calculating an evaluation of the elementary function using the reconfigurable inner stage performing a successive cumulative rotation recurrence; and
    responsive to determining that the input value is the floating-point input value,
    determining whether the input value belongs to a small value range;
    responsive to determining that the input value is outside the small value range, convert the floating-point input value into a fixed-point number;
    configuring the reconfigurable inner stage to the configuration for evaluating the type of the elementary function; and
    calculating the evaluation of the elementary function using the reconfigurable inner stage performing the successive cumulative rotation recurrence; and
    responsive to determining that the floating-point input value is in the small value range, calculating an approximation of the elementary function with respect to the input value.

* * * * *